Sept. 10, 1968 J. GUERNET 3,400,897

REEL FOR STORAGE AND SUPPLY OF TAPE OR FILM

Filed Aug. 30, 1966 2 Sheets-Sheet 1

INVENTOR
JACQUES GUERNET
BY Darby & Darby
ATTORNEYS

Sept. 10, 1968 J. GUERNET 3,400,897

REEL FOR STORAGE AND SUPPLY OF TAPE OR FILM

Filed Aug. 30, 1966 2 Sheets-Sheet 2

INVENTOR
JACQUES GUERNET

BY Darby & Darby
ATTORNEYS

United States Patent Office 3,400,897

Patented Sept. 10, 1968

3,400,897

REEL FOR STORAGE AND SUPPLY OF TAPE OR FILM

Jacques Guernet, La Celle-St-Cloud, Yvelines, France, assignor to Compagnie d'Applications Mecaniques à l'Atomistique (C.A.M.E.C.A.), Paris, France, a French corporation Continuation-in-part of application Ser. No. 483,192, Aug. 27, 1965. This application Aug. 30, 1966, Ser. No. 576,066

Claims priority, application France, Apr. 29, 1966, 59,594

6 Claims. (Cl. 242—74)

ABSTRACT OF THE DISCLOSURE

A supply reel for strip material such as tape or film having a hub and flanges, the flanges being provided with teeth on their peripheries which cooperate with mating teeth on a clip resiliently mounted on the flanges, so that the clip thus holds the end of a tape wound on the hub in position on the reel flanges. The flanges are provided with circumferential ribs to hold the clip, the ribs being at different radial distances on the flanges, thus assuring proper positioning of the clip and also providing for stacking of reels for storage. Additionally, the reel is formed with recesses to make handling thereof easy and is provided with means to signal when the tape is unwound to a predetermined degree and with means to detachably hold the inner tape end in position on the hub.

The present invention constitutes an improvement upon that disclosed in my copending application S.N. 483,192, filed Aug. 27, 1965, and this application is a continuation-in-part of that application.

In that copending application there is described a strip transport apparatus and in particular a motion picture projector or magnetic recorder in which the strip to be transported, namely, the film or magnetic tape, is wound on a supply reel and during unwinding, projecting or pick-up must be wound onto a reel known as the take-up reel, said apparatus having means which assure the transport of the end of the tape from the supply reel to the take-up reel.

The present invention relates to improvements in the supply reel and particularly to a braking device which prevents a clip holding the strip end from sliding along the walls of the reel; a special construction of the core of the reel permitting easy grasping of the said reel for its positioning; a modification of the "end-of-projection" device; a means of fastening the end of the strip on the reel which avoids tearing of the end of the strip when the reel is used in an ordinary non-automatic apparatus; and means permitting both proper positioning of the clip on the reel and stacking of the reels one on top of the other.

By way of example, in order to facilitate an understanding of the present invention, reference is had to the accompanying drawings in which.

Figures 3, 4, 5, 6:
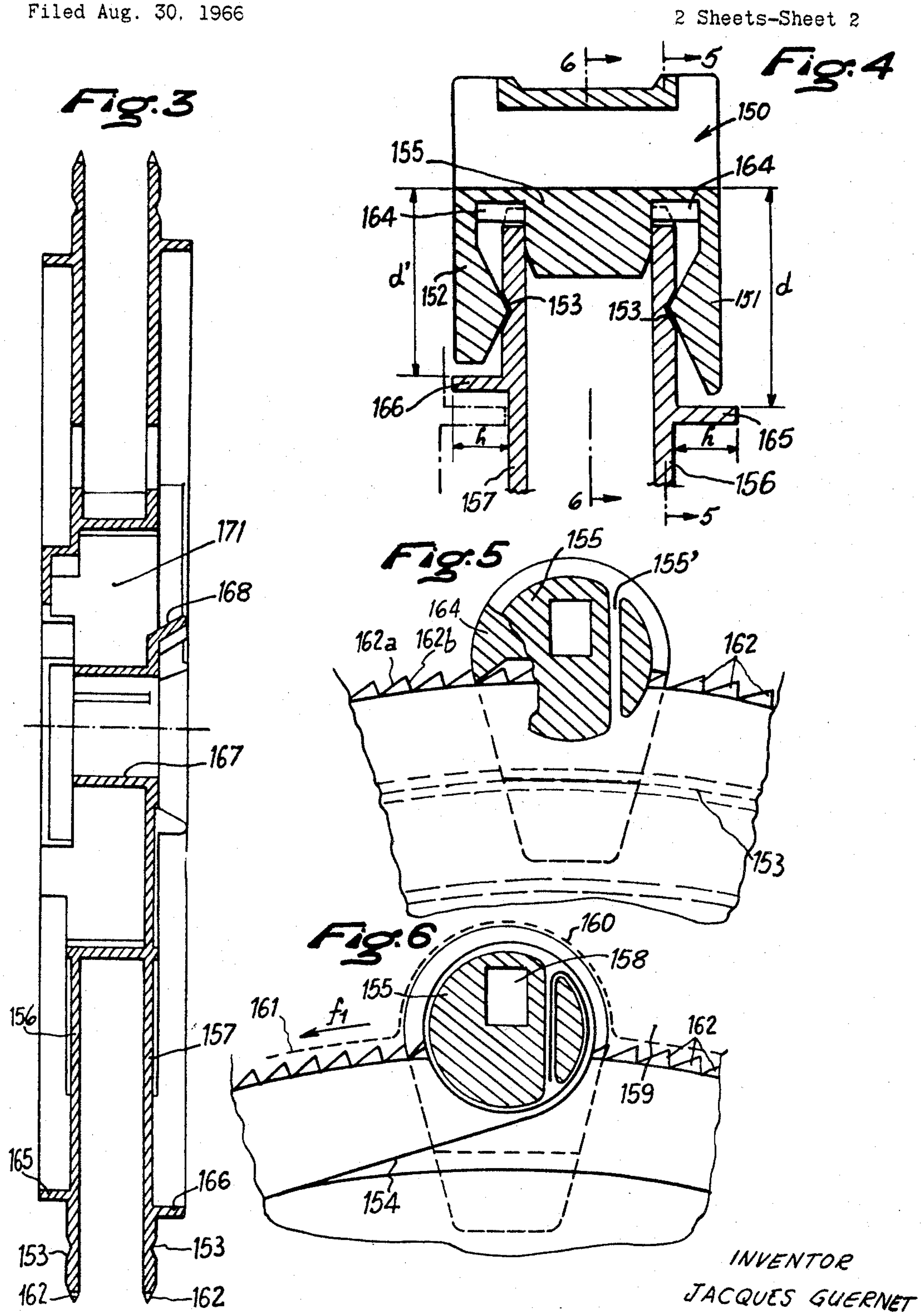
FIG. 3 is a cross sectional view of the reel of FIGS. 1–2 taken on the plane of the line 3—3 of FIG. 1.
FIG. 4 is a partial sectional view on a large scale showing the clip mounted on the reel, the view being taken on the plane of the line 4—4 of FIG. 1.
FIG. 5 is a cross sectional view along the line 5—5 of FIG. 4, partially broken away.
FIG. 6 is a cross sectional view along the line 6—6 of FIG. 4.

As has been explained in the copending application above identified, the clip 150 has two side pieces 151 and 152 which engage in circular grooves 153 of the reel (FIG. 4).

The end of the strip 154 which is to be unwound from the reel has a few turns wound (FIGS. 5 and 6) around the substantially circular core 155 of the clip 150, said core preferably having a slit 155' into which the end of the strip is first placed.

It has been found in use that it can happen that the clip 150 slides along the flanges 156 and 157 of the feed reel which causes the formation of a loop of the strip 154, which loop in certain cases may prevent proper positioning of the reel. As a matter of fact, the latter must be positioned precisely so that the transfer spindle fits in the orifice 158 provided for this purpose. In order to assure this positioning, the housing of the feed reel is surrounded with a hood 159, indicated in dotted line in FIG. 6, said hood having a recess 160 intended to receive the clip 150. It is obvious that if the clip 150 has slid in the direction indicated by the arrow $f_1$, the strip 154 forms a loop which may strike the rim 161 of the hood 159, preventing the positioning of the reel on its spindle.

In order to overcome this drawback, there have been arranged all around the periphery of the side plates or flanges 156 and 157 of the reel, teeth 162 of double inclination, the edges of which are substantially perpendicular to each other, the slope 162*a* making a slight angle with the tangent to the flange at the point in question and the slope 162*b* making a large angle. The clip 150 is provided, between the core 155 and the side plates 156 and 157, with projections or teeth 164, one of which is shown in FIG. 5.

The projections 164 act on the teeth 162 like a ratchet, the movement of the clip in the direction of the arrow $f_1$ (FIG. 6) being prevented and the movement in opposite direction being possible, until the film has been made taut.

Referring now to FIG. 4, it is seen that the flanges 156 and 157 of the reel each have a circular rib 165 and 166. These ribs are placed asymmetrically, the distance $d$ between the rib 165 and the periphery of the reel being greater than the distance $d'$ between the rib 166 and the periphery of the reel. Furthermore, the side plates 151 and 152 of the reel clip 150 are not of the same length. This arrangement has the result that it is impossible to place the clip in reversed position on the reel after it has been handled for any reason, since the side plate 151 is longer than $d'$.

The ribs 165 and 166 have a height $h$ which is sufficiently large so that they extend beyond the side plates 153 and 152.

Due to the fact that the ribs 165 and 166 are staggered, when the reels are stacked on each other, the rib 165 of one reel fits within the rib 166 of the other, the clip 150 being furthermore protected from any contact.

This makes it readily possible to stack the reels one on the other without being forced to place them in metal cans, as is generally done.

Figures 1, 2:
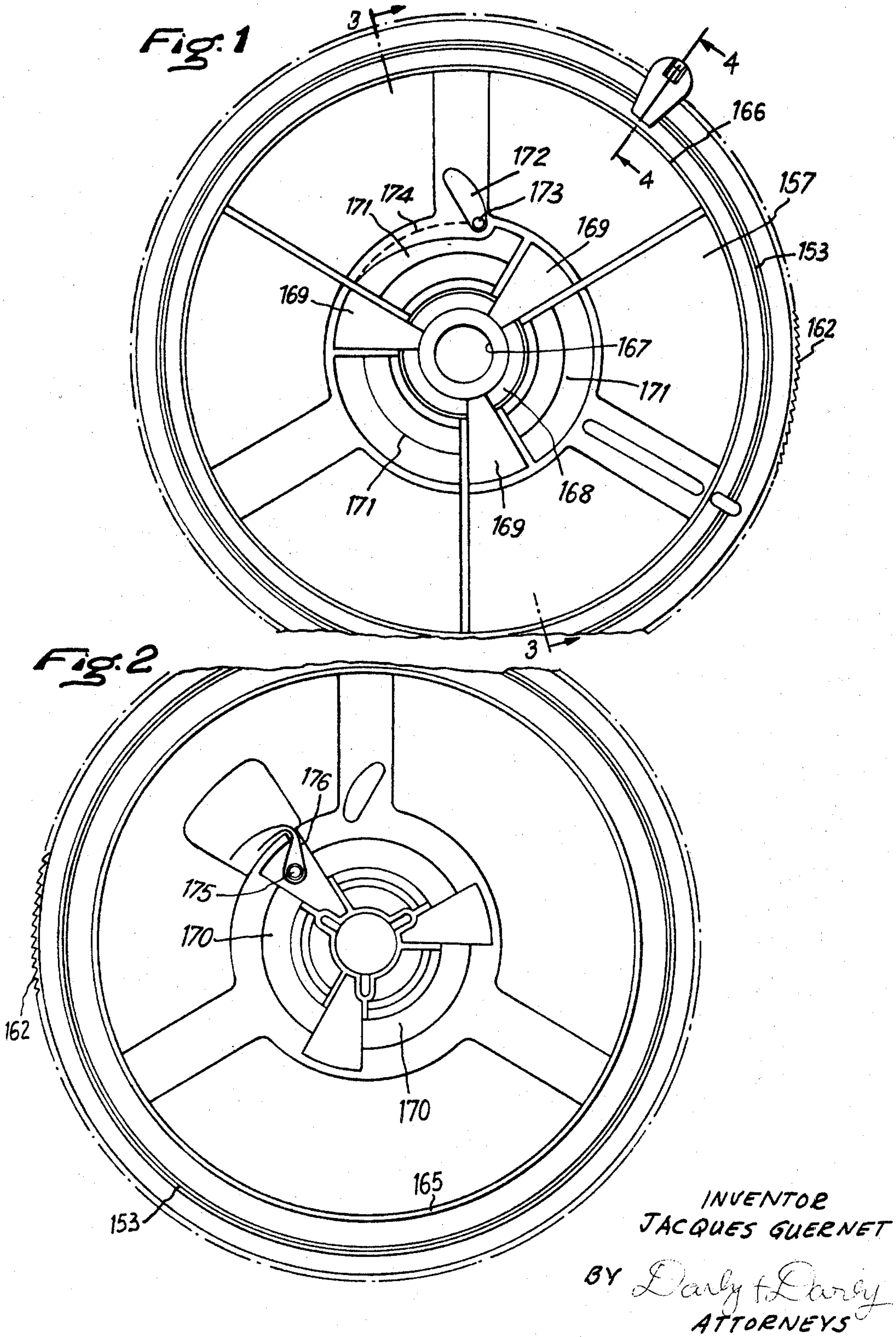
FIG. 1 is a top plan view of one embodiment of the reel.
FIG. 2 is a bottom plan view of the reel of FIG. 1.

Referring to FIGS. 1 to 3, it is seen that the reel comprises a hub 167 provided with a flared rim 168. Hub 167 is connected, on one side, to the flange 157 by three fingers or spokes 169 (FIGS. 1 and 3) and, on the other side, to the flange 156 by three fingers 170. In the example shown, the three fingers 169 consist of three sectors located 120° from each other and having an opening of 30°; the fingers 170 are also arranged 120° from each other and have an opening of 90°. The fingers 169 and 170 are arranged staggered, so that, in FIG. 1, the fingers 169 are at the level of the side plate 157 and the fingers 170 are sunken, at the level of the side plate 156; and vice versa in FIG. 2.

This arrangement results in three hollow spaces 171 around the flared collar 168 of the hub 167 when the reel is in the position shown in FIG. 1, which makes it possible to grasp the reel by the said collar 168 with three fingers to place it in the hood 159 orienting it properly so that the clip 150 engages in the recess 160, the spindle of the automatic transfer rod coming into place in the orifice 158.

The present reel comprises, in addition, an "end-of-projection" device which is improved over that described in the above mentioned copending application. The device described in that application consisted of a tongue rigidly connected with a lever urged outwardly by a spring, the end of which tongue protruded beyond the periphery of the core of the reel when the said tongue passed into perforations provided in the leader of the strip (tape). When it thus protruded beyond the periphery of the reel, the end of the lever acted on a microswitch contact.

In accordance with the present invention, the flanges 156 and 157 have openings 172 in which a spindle 173 which is arranged at the free end of a spring blade 174 fastened to the core of the reel can move.

The length of the spindle 173 is greater than the distance between the two flanges 156 and 157, so that it protrudes on the sides of the reel.

When the strip (tape) is completely unwound, the spring blade 174 raises the spindle 173 which moves generally radially outwardly until it strikes the end of opening 172; in this position as the reel rotates the spindle strikes against a contact which stops the projection.

The length by which the spindle 174 protrudes out of the reel is less than the height *h* of the ribs 165 and 166, so that said spindle is protected when the reels are stacked on each other.

For obvious commercial reasons, it is necessary that the feed reel can be used on ordinary projectors. Now, these projectors do not have any "end-of-projection" stop device and therefore one cannot firmly fasten the end of the strip on the core, since it would be torn off; however, it is necessary that it be fixed sufficiently firmly not to slip.

For this purpose, there is arranged in one of the three hollow spaces present below the fingers 169 a stud 175 (FIG. 2) on which there fits a loop 165 made from the end of the strip; the two strands of the loop passing through a slit 176 provided in the core.

Thus the strip is fastened sufficiently firmly not to slide perceptibly during the repetition of the automatic projecting cycles and when the reel is placed in a conventional non-automatic apparatus, if the apparatus is not stopped in time, the loop unwinds around the stud 175 without tearing.

What is claimed is:

1. A strip supply reel for automatic reproducers of sound, pictures, or the like, comprising, in combination, a core on which the strip is adapted to be wound, a pair of flanges extending radially outward from each end of the core, teeth formed on the outer periphery of said flanges, peripheral grooves in said flanges, a clip adapted to receive the end of the strip wound on said core, said clip comprising side plates having inwardly facing projections adapted to engage said grooves on said clip and having teeth thereon adapted to engage said teeth of said flanges to thereby prevent loosening of the strip wound on said core and fastened to said clip.

2. A strip supply reel as claimed in claim 1 wherein each of said reel flanges has axially outwardly projecting ribs thereon, said ribs being spaced radially inwardly of the flange peripheries at different distances therefrom, and wherein said clip side pieces are of different length corresponding to said different radial distances to assure that said clip be placed on said reel with said clip teeth properly engaging said reel flange teeth.

3. A strip supply reel as claimed in claim 1 wherein said reel has a mounting hub integral therewith, said reel flanges extending radially inward of said core, said hub having a rim thereon at one end thereof and the adjacent flange having recesses therein to provide a plurality of angularly spaced finger holes.

4. A strip supply reel as claimed in claim 1 wherein said reel flanges are provided with oblong openings radially outward of said core, a spindle extends transversely of said reel with its ends projecting into said openings and a resilient member fixed to said core and extending over part of the periphery thereof is fixed to said spindle and urges it away from said core, said spindle being normally held against said core by the strip wound thereon.

5. A strip supply reel as claimed in claim 2 wherein said different radii at which said ribs are placed adapts said reels to be stacked with the lesser radius rib of one reel fitted into the greater radius rib of the next reel in the stack.

6. A strip supply reel as claimed in claim 3 wherein an opening is formed in one of said reel flanges adjacent said core, said opening extending radially on either side of said core, a pin mounted on the inner face of the other flange and extending into said opening on the radially inward side of said core and a slot formed in the core joining said openings whereby a strip loop may be placed about said pin with a double thickness in said slot to hold strip in position on said core.

References Cited

UNITED STATES PATENTS

| | | | |
|---|---|---|---|
| 3,204,888 | 9/1965 | Bernat | 206—53 X |
| 3,306,545 | 2/1967 | Vogler et al. | 242—55.13 |

GEORGE F. MAUTZ, *Primary Examiner.*